US012720063B2

(12) United States Patent
Meardi

(10) Patent No.: US 12,720,063 B2
(45) **Date of Patent: *Aug. 25, 2026**

(54) MODIFIED UPSAMPLING FOR VIDEO CODING TECHNOLOGY

(71) Applicant: V-NOVA INTERNATIONAL LIMITED, London (GB)

(72) Inventor: Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/000,521

(22) Filed: Dec. 23, 2024

(65) Prior Publication Data

US 2025/0301142 A1 Sep. 25, 2025

Related U.S. Application Data

(63) Continuation-in-part of application No. 17/441,038, filed as application No. PCT/GB2020/050574 on Mar. 10, 2020, now Pat. No. 12,177,468.

(30) Foreign Application Priority Data

Mar. 20, 2019 (GB) .................................... 1903844
Mar. 23, 2019 (GB) .................................... 1904014
(Continued)

(51) Int. Cl.
*H04N 19/132* (2014.01)

(52) U.S. Cl.
CPC ................................. *H04N 19/132* (2014.11)

(58) Field of Classification Search
CPC ........ H04N 19/30; H04N 19/31; H04N 19/46; H04N 19/85; H04N 19/88; H04N 19/70;
(Continued)

(56) References Cited

U.S. PATENT DOCUMENTS 6,249,549 B1 * 6/2001 Kim .................... H04N 19/428 382/248
8,964,854 B2 2/2015 Tu et al.
(Continued)

FOREIGN PATENT DOCUMENTS

CA 2281391 A1 4/2000
CN 105144719 A 12/2015
(Continued)

OTHER PUBLICATIONS

International Search Report and Written Opinion for PCT/GB2020/050574 mailed Jun. 17, 2020.
(Continued)

*Primary Examiner* — Masum Billah
(74) *Attorney, Agent, or Firm* — Workman Nydegger

(57) ABSTRACT

A first level encoded stream is received and decoded to derive a first set of residuals. A first output video comprising an output of a base decoder applied to a base level encoded stream is received. The first set of residuals is combined with the first output video to generate a second output video. The second output video is up-sampled to generate an up-sampled second output video. The up-sampling comprises adding a value derived from an element in the first set of residuals from which a block in the up-sampled second output video was derived to the block in the up-sampled second output video. A second level encoded stream is received and decoded to derive a second set of residuals. The second set of residuals is combined with the up-sampled second output video to generate a reconstructed output video.

17 Claims, 4 Drawing Sheets

(30) Foreign Application Priority Data

Mar. 29, 2019 (GB) ...................................... 1904492
Apr. 15, 2019 (GB) ...................................... 1905325

(58) Field of Classification Search

CPC ...... H04N 19/59; H04N 19/187; H04N 19/33; H04N 19/436; H04N 19/102; H04N 7/181; H04N 7/183; H04N 21/44004; H04N 19/61; H04N 21/236; H04N 21/23406; H04N 21/8451; H04N 19/176; H04N 19/117; H04N 19/186; H04N 19/82; H04N 19/80; H04N 19/132; H04N 19/105; H04N 19/172; H04N 19/44; H04N 19/597

USPC .......................................................... 375/240

See application file for complete search history.

(56) References Cited

U.S. PATENT DOCUMENTS

| | | | | |
|---|---|---|---|---|
| 2003/0067637 | A1 | 4/2003 | Hannuksela | |
| 2004/0042549 | A1 | 3/2004 | Huang et al. | |
| 2008/0165848 | A1* | 7/2008 | Ye | H04N 19/30 375/E7.17 |
| 2008/0304566 | A1 | 12/2008 | Yoon et al. | |
| 2009/0232198 | A1 | 9/2009 | Cho et al. | |
| 2011/0194618 | A1 | 8/2011 | Gish et al. | |
| 2011/0261888 | A1 | 10/2011 | Cammas et al. | |
| 2012/0183076 | A1 | 7/2012 | Boyce | |
| 2013/0044813 | A1 | 2/2013 | Boon | |
| 2013/0272406 | A1 | 10/2013 | Yu | |
| 2013/0314496 | A1 | 11/2013 | Rossato et al. | |
| 2014/0185680 | A1 | 7/2014 | Li et al. | |
| 2014/0192886 | A1 | 7/2014 | Francois et al. | |
| 2014/0219346 | A1 | 8/2014 | Ugur | |
| 2016/0360213 | A1 | 12/2016 | Lee et al. | |
| 2017/0127085 | A1 | 5/2017 | Sun | |

FOREIGN PATENT DOCUMENTS

| | | | | |
|---|---|---|---|---|
| EP | 2090108 | | 6/2013 | |
| GB | 2552353 | | 1/2018 | |
| JP | H11289542 | | 10/1999 | |
| JP | 2014132759 | | 7/2014 | |
| KR | 10-2009-0108077 | A | 10/2009 | |
| WO | WO-2006118383 | A1 * | 11/2006 | H04N 19/34 |
| WO | 2014/011480 | A1 | 1/2014 | |
| WO | 2019-111011 | | 6/2019 | |

OTHER PUBLICATIONS

GB2312670.9 Search & Exam report dated Sep. 12, 2023.

GB2312675.8 Search & Exam report dated Sep. 12, 2023.

Search & Examination for GB2312636.0 dated Sep. 28, 2023.

EGPO—Egyptian Patent Office 2021091475 Sep. 19, 2021.

"Working Draft of Low Complexity Enhancement Video Coding", 126. MPEG Meeting, Mar. 25, 2019 to Mar. 29, 2019, Geneva (Motion Picture Expert Group or ISO/IEC JTC1/SC29/WG11), No. n18454, Apr. 18, 2019, XP030208724, retrieved from the internet on Feb. 1, 2021: URL: https://mpeg.chiariglione.org/meetings/126.

International Preliminary Report on Patentability received for PCT Patent Application No. PCT/GB2020/050574, mailed on Sep. 16, 2021, 9 pages.

GB2312647.7 Search and Examination Report dated Sep. 7, 2023.

GB2312674.1 Search and Examination Report dated Oct. 10, 2023.

GB2312680.8 Search Report dated Oct. 5, 2023.

International Search Report and Written Opinion received for PCT Patent Application No. PCT/GB2020/050574, mailed on Jun. 17, 2021, 12 pages.

Notice of Allowance received for U.S. Appl. No. 17/441,038, mailed on Apr. 30, 2024, 9 pages.

Notice of Allowance received for U.S. Appl. No. 17/441,038, mailed on Aug. 9, 2024, 9 pages.

Office Action received for EG Patent Application No. EG/P/2021/01475, mailed on Oct. 2, 2025, 9 pages (5 pages of English Translation and 4 pages of Original Document).

Office Action received for GB Patent Application No. 2312636.0, mailed on Sep. 28, 2023, 4 pages.

V-NOVA, "Working Draft of Low Complexity Enhancement Video Coding", Approved WG 11 document, Mar. 29, 2019, 56 Pages.

* cited by examiner

MODIFIED UPSAMPLING FOR VIDEO CODING TECHNOLOGY

CROSS-REFERENCE TO RELATED APPLICATIONS

The present application is a continuation of U.S. patent application Ser. No. 17/441,038, filed on September, 21, which is a 371 US Nationalization of International Patent Application No. PCT/GB/050574, filed March 10, which claims priority to UK Patent Application Nos. 1903844.7, filed March, 19, 1904014.6, filed March 23, 19, 1904492.4, filed March 29, 19, and 19053.5, filed April, 19, the entire disclosures of which are incorporated herein by reference.

TECHNICAL FIELD

The present invention relates to methods, apparatuses, computer programs and computer-readable media for use in video coding technology.

BACKGROUND

Compression and decompression of signals is a consideration in many known systems. Many types of signal, for example video, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the ability of the encoder and/or the decoder to process information efficiently. The efficiency with which the encoder and/or the decoder processes information may be a factor in the performance level of the encoder and/or the decoder.

SUMMARY

Various aspects of the present invention are set out in the appended claims.

Further features and advantages will become apparent from the following description, which is made with reference to the accompanying drawings.

BRIEF DESCRIPTION OF THE DRAWINGS

Figure I is a schematic diagram illustrating an encoding process according to examples herein.

DETAILED DESCRIPTION

Described herein is a hybrid backward-compatible coding technology. The examples described herein provide a flexible, adaptable, highly efficient and computationally inexpensive coding format which combines a different video coding format, a base codec, (e.g. AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture.

Thus, the streams are considered to be a base stream and an enhancement stream. It is worth noting that typically the base stream is expected to be decodable by a hardware decoder while the enhancement stream is expected to be suitable for software processing implementation with suitable power consumption.

This structure creates a plurality of degrees of freedom that allow great flexibility and adaptability to many situations, thus making the coding format suitable for many use cases including OTT transmission, live streaming, live UHD broadcast, and so on.

Although the decoded output of the base codec is not intended for viewing, it is a fully decoded video at a lower resolution, making the output compatible with existing decoders and, where considered suitable, also usable as a lower resolution output.

The codec format uses a minimum number of simple coding tools. When combined synergistically, they can provide visual quality improvements when compared with a full resolution picture encoded with the base codec whilst at the same time generating flexibility in the way they can be used.

Figure 1:
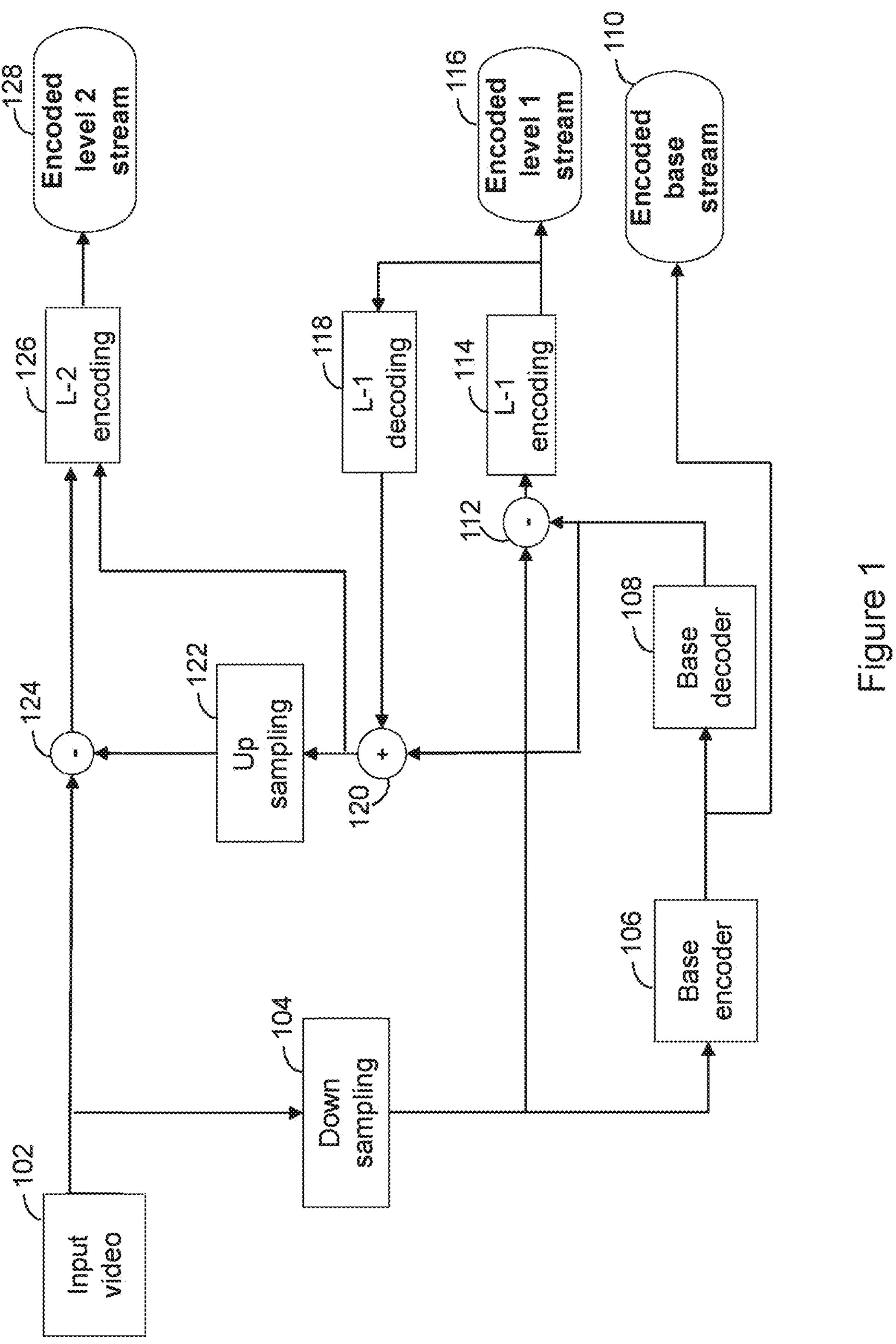

An encoding process is depicted in the block diagram of FIG. 1. An input full resolution video 102 is processed to generate various encoded streams. A first encoded stream (encoded base stream 110) is produced by feeding a base encoder 106 (e.g., AVC, HEVC, or any other codec) with a down-sampled version of the input video, which is produced by down-sampling 104 the input video 102. A second encoded stream (encoded level I stream 116) is produced by applying an encoding operation 114 to the residuals obtained by taking the difference 112 between the reconstructed base codec video and the down-sampled version of the input video. The reconstructed base codec video is obtained by decoding the output of the base encoder 106 with a base decoder 108. A third encoded stream (encoded level 2 stream 128) is produced by processing 126 the residuals obtained by taking the difference 124 between an up-sampled version of a corrected version of the reconstructed base coded video and the input video 102. The corrected version of the reconstructed base codec video is obtained by summing 1 the reconstructed base codec video and the residuals obtained by applying a decoding operation 118 to the encoded level I stream 116.

Figure 2:
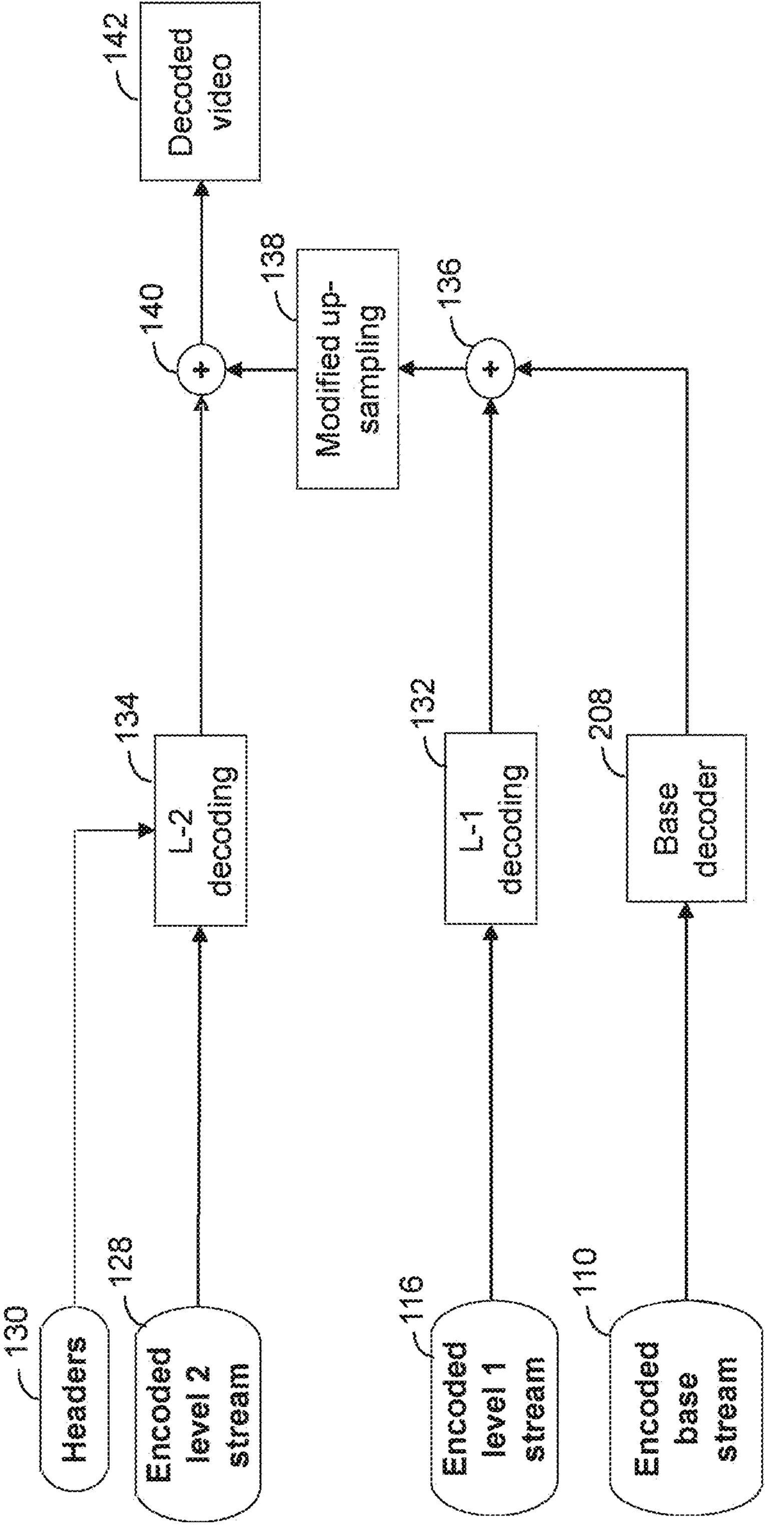
FIG. 2 is a schematic diagram illustrating a decoding process according to examples herein.

The decoding process is depicted in the block diagram of FIG. 2. The decoder receives the three streams (the encoded base stream 110, the encoded level I stream 116 and the encoded level 2 stream 128) generated by the encoder together with headers 1 containing further decoding information. The encoded base stream 110 is decoded by a base decoder 8 corresponding to the base decoder 108 used in the encoder, and its output is combined 136 with the decoded residuals obtained by decoding 132 the encoded level I stream 116. The combined video is up-sampled 138 and further combined 140 with the decoded residuals obtained by applying a decoding operation 134 to the encoded level 2 stream 128.

Figure 3:
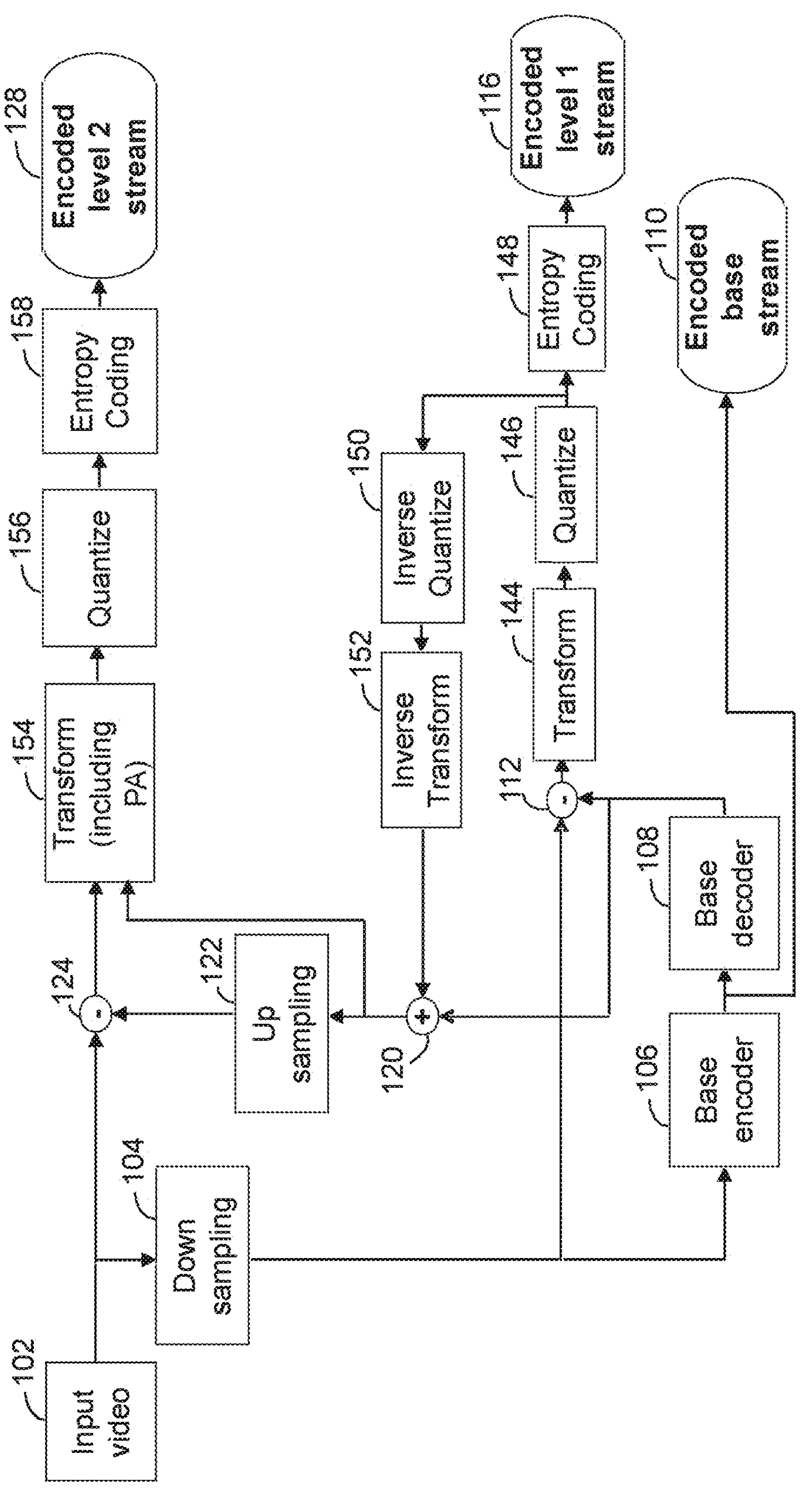
FIG. 3 is a schematic diagram illustrating an encoding process according to examples herein.

FIG. 3 illustrates an implementation example of the encoding process described briefly above and illustrated in FIG. 1. As is clearly identifiable, the encoding and decoding steps of the stream are expanded in more detail to provide an example of how the steps may be performed.

The base stream 110 is substantially created by a process as noted above. That is, an input video 102 is down-sampled 104 (i.e. a down-sampling operation 104 is applied to the input video 102 to generate a down-sampled input video). The down-sampled video obtained by down-sampling 104 the input video 102 is then encoded using a first base encoder 106 (i.e. an encoding operation is applied to the down-sampled input video to generate an encoded base stream 110 using a first or base encoder 106). Preferably the first or base encoder 106 is a codec suitable for hardware decoding. The encoded base stream 110 may be referred to as the base layer or base level.

As noted above, the enhancement stream may comprise two streams. A first level of enhancement provides for a set of correction data which can be combined with decoded version of the base stream to generate a corrected picture. This first enhancement stream is illustrated in FIGS. 1 and 3 as the encoded Level 1 stream 116. To generate the encoded Level 1 stream 116, the encoded base stream 110 is decoded using a base decoder 108 (i.e. a decoding operation is applied to the encoded base stream 110 to generate a decoded base stream). The difference 112 between the decoded base stream and the down-sampled input video obtained by down-sampling 104 the input video 102 is then created (i.e. a subtraction operation 112 is applied to the down-sampled input video and the decoded base stream to generate a first set of residuals). Here the term "residuals" is used in the same manner as that known in the art, that is, the error between a reference frame and a desired frame. Here the reference frame is the decoded base stream and the desired frame is the down-sampled input video. Thus, the residuals used in the first enhancement level can be considered as a corrected video as they 'correct' the decoded base stream to the down-sampled input video that was used in the base encoding operation.

The difference 112 is then encoded to generate the encoded Level 1 stream 116 (i.e. an encoding operation 114 is applied to the first set of residuals to generate a first enhancement stream 116).

In the example implementation of FIG. 3, the encoding operation comprises several steps, each of which is optional and preferred and provides particular benefits.

In FIG. 3, the steps include a transform step 144, a quantization step 146 and an entropy encoding step 148.

Although not shown in the Figures, in some examples, the encoding process 114 identifies if the residuals ranking mode is selected. If residuals mode is selected the residuals ranking step may be performed (i.e. a residuals ranking operation may be performed on the first step of residuals to generate a ranked set of residuals). The ranked set of residuals may be filtered so that not all residuals are encoded into the first enhancement stream 116 (or correction stream).

The first set of residuals, or the ranked or filtered first set of residuals are then transformed 144, quantized 146 and entropy encoded 148 to produce the encoded Level 1 stream 116 (i.e. a transform operation 144 is applied to the first set of residuals or the filtered first set of residuals depending on whether or not ranking mode is selected to generate a transformed set of residuals; a quantization operation 146 is applied to the transformed set of residuals to generate a set of quantized residuals; and, an entropy encoding operation 148 is applied to the quantized set of residuals to generate the first level of enhancement stream 116). Preferably, the entropy encoding operation 148 may be a Huffman encoding operation or a run-length encoding operation or both.

Optionally a control operation (not shown in the Figures) may be applied to the quantized set of residuals so as to correct for the effects of the ranking operation.

As noted above, the enhancement stream may comprise a first level of enhancement 116 and a second level of enhancement 128. The first level of enhancement 116 may be considered to be a corrected stream. The second level of enhancement 128 may be considered to be a further level of enhancement that converts the corrected stream to the original input video.

The further level of enhancement 128 is created by encoding 126 a further set of residuals which are the difference 124 between an up-sampled version of a decoded level 1 stream and the input video 102, as shown in FIG. 1.

In FIG. 3, the quantized (or controlled) set of residuals are inversely quantized 0 and inversely transformed 2 before a de-blocking filter (not shown in the Figures) is optionally applied to generate a decoded first set of residuals (i.e. an inverse quantization operation 0 is applied to the quantized first set of residuals to generate a de-quantized first set of residuals; an inverse transform operation 2 is applied to the de-quantized first set of residuals to generate a de-transformed first set of residuals; and, a de-blocking filter operation is optionally applied to the de-transformed first set of residuals to generate a decoded first set of residuals). The de-blocking filter step is optional depending on the transform 144 applied and comprises applying a weighted mask to each block of the de-transformed 2 first set of residuals.

The decoded base stream is combined 1 with the decoded first set of residuals (i.e. a summing operation 1 is performed on the decoded base stream and the decoded first set of residuals to generate a re-created first stream). As illustrated in FIGS. 1 and 3, that combination is then up-sampled 122 (i.e. an up-sampling operation 122 is applied to the re-created first stream to generate an up-sampled re-created stream).

The up-sampled stream is then compared to the input video 102 which creates a further set of residuals (i.e. a difference operation 124 is applied to the up-sampled re-created stream to generate a further set of residuals). The further set of residuals are then encoded as the encoded Level 2 enhancement stream 128 (i.e. an encoding operation 126 is then applied to the further set of residuals to generate an encoded further enhancement stream 128).

As with the encoded Level 1 stream 116, the encoding applied to the level 2 residuals may comprise several steps. FIG. 3 illustrates the steps as transform 4, quantization 6 and entropy encoding 8.

Although not shown in the Figures, in some examples, the encoding process identifies if the residuals ranking mode is selected. If residuals mode is selected the residuals ranking step may be performed (i.e. a residuals ranking operation may be performed on the further set of residuals to generate a further ranked set of residuals). The further ranked set of residuals may be filtered so that not all residuals are encoded into the further enhancement stream 128.

The further set of residuals or the further ranked set of residuals are subsequently transformed 4 (i.e. a transform operation 4 is performed on the further ranked set of residuals to generate a further transformed set of residuals). As illustrated, the transform operation 4 may utilise a predicted coefficient or predicted average derived from the re-created first stream, prior to up-sampling 122. Further information is below.

Although not shown in the Figures, in some examples, the further transformed 4 set of residuals may undergo a temporal prediction step. Note the temporal prediction step may also be applied to the first set of residuals in the chain creating the level 1 enhancement stream 116. When temporal prediction is selected, the encoder may further modify the coefficients by subtracting the corresponding coefficients derived from a temporal buffer. In summary, the encoded coefficients correspond to a difference between the frame and another frame of the stream. The other frame may be an earlier or later frame (or block in the frame) in the stream. Thus, instead of encoding 126 the residuals between the up-sampled re-created stream and the input video 102, the encoding process 126 may encode the difference between a transformed frame in the stream and the transformed residuals of the frame. Thus, the entropy may be reduced. When temporal prediction is active, each transformed coefficient may be:

!::.=Fcurrent−Fbuffer where the buffer may store the previous frame and may send the difference to the buffer rather than the tile. Thus, in effect the residual is with respect to the buffer and not the frame.

The transformed residuals (either temporally predicted or otherwise) are then quantized 6 and entropy encoded 8 in the manner described elsewhere (i.e. a quantization operation 6 is applied to the transformed 4 set of residuals to generate a further set of quantized residuals; and, an entropy encoding operation 8 is applied to the quantized further set of residuals to generate the further level of enhancement stream). Thus, as illustrated in FIG. 3 and described above, the output of the encoding process is a base stream 110 and one or more enhancement streams which preferably comprise a first level of enhancement 116 and a further level of enhancement 128.

Figure 4:
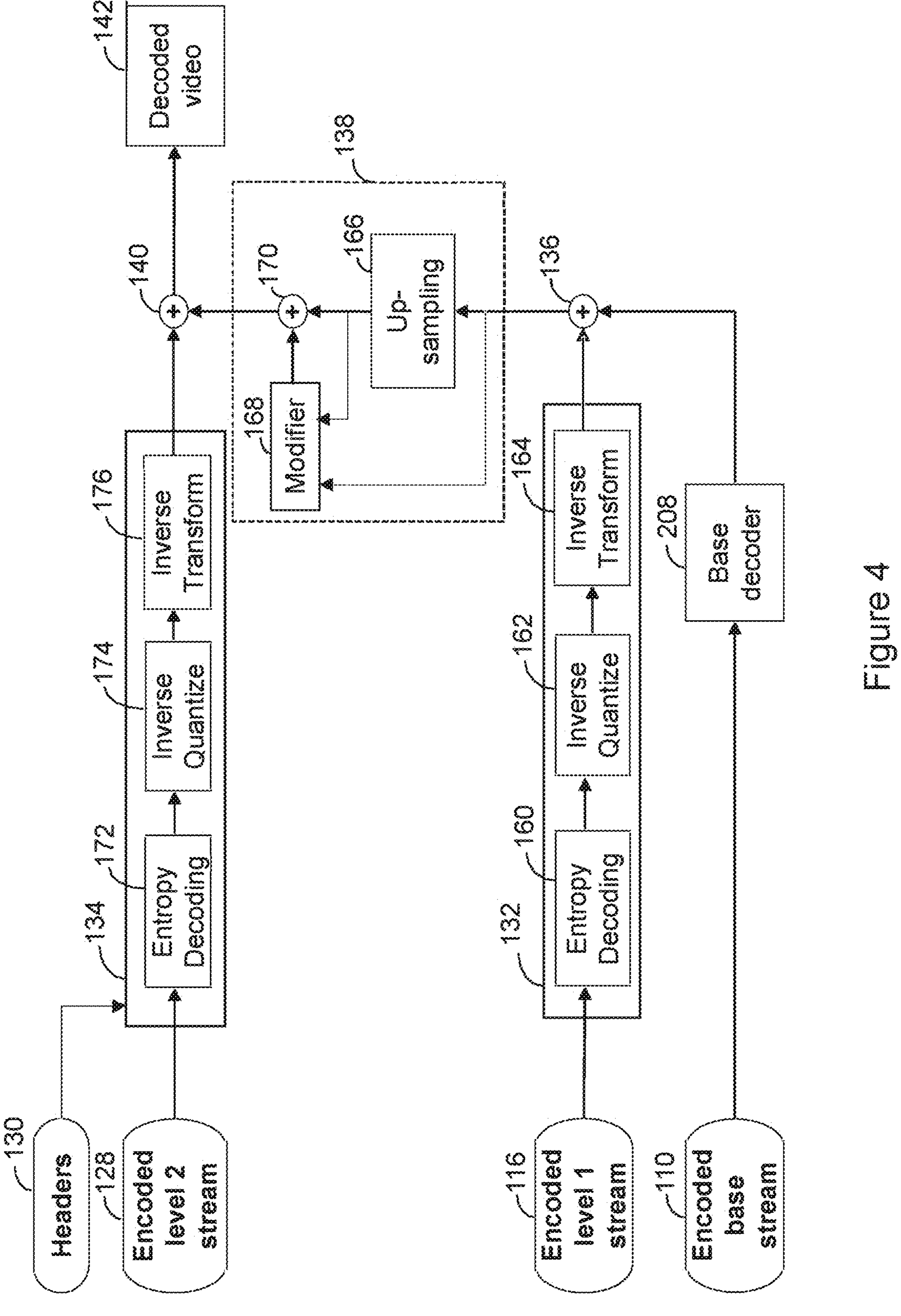
FIG. 4 is a schematic diagram illustrating a decoding process according to examples herein.

FIG. 4 illustrates an implementation example of the decoding process described briefly above and illustrated in FIG. 2. As is clearly identifiable, the steps are expanded in more detail to provide an example of how the steps may be performed.

FIG. 4 is described in more detail further below.

In the decoding process, the decoder may parse the headers 1 (e.g. containing global configuration data, picture configuration data, and other data blocks) and configure the decoder based on those headers 1. In order to re-create the input video 102, the decoder may decode each of the base stream 110, the first enhancement stream 116 and the further enhancement stream 128. The frames of the stream may be synchronised and then combined to derive the decoded video 142.

In each decoding process, the enhancement streams may undergo the steps of entropy decoding 160, 172, inverse quantization 162, 174 and inverse transform 164, 176 to re-create a set of residuals.

The decoding process of FIG. 4 comprises retrieving an array of entropy decoded quantized coefficients representing a first level of enhancement and outputting an array of L-1 residuals. The decoding process of FIG. 4 further comprises retrieving an array of samples of output of a base decoder 8. The decoding process of FIG. 4 further comprises applying a de-quantization process 162 to the array of entropy decoded quantized coefficients to derive a set of de-quantized coefficients, applying a transformation process 164 to the set of de-quantized coefficients and optionally applying a filter process (Not shown in FIG. 4) to output the array of L-1 residuals representing a first level of enhancement. The decoding process of FIG. 4 then further comprises recreating 136 a picture from combining 136 the array of L-1 residuals with the array of samples of output of the base decoder 8. The decoding process of FIG. 4 comprises applying a transform process 164 from a set of predetermined transform processes according to a signalled parameter. For example, the transform process 164 may be applied on a 2×2 coding unit or a 4×4 coding unit. A coding unit may be referred to herein as a block of elements in an array, in this case the array of L-1 residuals.

The decoding process of FIG. 4 comprises retrieving an array of entropy decoded quantized coefficients representing a further level of enhancement and outputting an array of residuals. In the decoding process shown in FIG. 4, the further level of enhancement is a second level of enhancement and the array of residuals output is an array of L-2 residuals. The method of FIG. 4 further comprises retrieving the array of L-1 residuals of the first level of enhancement corresponding to the array of entropy decoded quantized coefficients representing a further level of enhancement.

The method of FIG. 4 further comprises applying an up-sampling process 138 to the array of residuals of the first level of enhancement. In FIG. 4, the up-sampling process 138 is applied to the combination of the array of L-1 residuals of the first level of enhancement and the corresponding array of samples of output of the base decoder 8. Although not shown in FIG. 4, in some examples, the method comprises applying a temporal prediction process to the array of entropy decoded quantized coefficients representing a further level of enhancement to derive an array of temporally predicted samples. The method of FIG. 4 further comprises applying a de-quantization process 174 to the array of entropy decoded quantized coefficients to derive a set of de-quantized coefficients, applying a transformation process 176 to the set of de-quantized coefficients to derive a set of transformed coefficients. In some examples, the array of temporally predicted samples may then be combined with the set of transformed coefficients to derive an array of L-2 residuals for the further layer of enhancement.

The method of FIG. 4 then further comprises recreating 140 a picture from the array of L-2 residuals, for example by adding 140 the array of L-2 residuals to the array resulting from the up-sampling process 138. The method may comprise applying a transform process 176 from a set of predetermined transform processes according to a signalled parameter. For example, the transform process 176 may be applied on a 2×2 block of elements in the array of L-2 residuals or a 4×4 block of elements in the array of L-2 residuals.

The decoding process of FIG. 4 composes performing a modified up-sampling process 138 as described below with further reference to FIG. 4. The step of adding a modifier 168 defined below may be performed as part of the transform process 176. Alternatively, since the transform process 176 involves a linear transformation, the step of adding a modifier 168 may be performed as part of the modified up-sampling process 138 as described below. The step of adding a modifier 168 therefore results in a modification of a residual. The modification may be performed based on a location of the residual in a frame. The modification may be a predetermined value.

Each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

It was noted above how a set of tools may be applied to each of the enhancement streams (or the input video 102) throughout the process. The following provides a summary each of the tools and their functionality within the overall process as illustrated in FIGS. 1 to 4.

The down-sampling process 104 is applied to the input video 102 to produce a down-sampled video to be encoded by a base encoder 106. The down-sampling 104 can be done either in both vertical and horizontal directions, or alternatively only in the horizontal direction.

The input to the L-1 encoding operation 114 comprises the L-1 residuals obtained by taking the difference 112 between the decoded output of the base decoder 108 and the down-sampled video obtained by down-sampling 104 the input video 102. The L-1 residuals are then transformed 144, quantized 146 and encoded 148 as further described below.

There are two types of transforms that could be used in the transformation process 144. Both leverage small kernels which are applied directly to the residuals that remain after the stage of applying the predicted average. A first transform has a 2×2 kernel which is applied to a 2×2 block of residuals.

The resulting coefficients are as follows:

$$\begin{pmatrix} C_{00} \\ C_{01} \\ C_{10} \\ C_{11} \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} R_{00} \\ R_{01} \\ R_{10} \\ R_{11} \end{pmatrix}$$

A second transform has a 4×4 kernel which is applied to a 4×4 block of residuals. The resulting coefficients are as follows:

$$\begin{pmatrix} C_{00} \\ C_{01} \\ C_{02} \\ C_{03} \\ C_{10} \\ C_{11} \\ C_{12} \\ C_{13} \\ C_{20} \\ C_{21} \\ C_{22} \\ C_{23} \\ C_{30} \\ C_{31} \\ C_{32} \\ C_{33} \end{pmatrix} = \begin{pmatrix} 1 & 1 & 1 & 1 & 1 & 1 & 1 & 1 & 1 & 1 & 1 & 1 & 1 & 1 & 1 & 1 \\ 1 & 1 & -1 & -1 & 1 & 1 & -1 & -1 & 1 & 1 & -1 & -1 & 1 & 1 & -1 & -1 \\ 1 & -1 & 1 & -1 & 1 & -1 & 1 & -1 & 1 & -1 & 1 & -1 & 1 & -1 & 1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & 1 & 1 & 1 & 1 & -1 & -1 & -1 & -1 & -1 & -1 & -1 & -1 \\ 1 & 1 & -1 & -1 & 1 & 1 & -1 & -1 & -1 & -1 & 1 & 1 & -1 & -1 & 1 & 1 \\ 1 & -1 & 1 & -1 & 1 & -1 & 1 & -1 & -1 & 1 & -1 & 1 & -1 & 1 & -1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & 1 & 1 & 1 & 1 & -1 & -1 & -1 & -1 \\ 1 & 1 & -1 & -1 & -1 & -1 & 1 & 1 & 1 & 1 & -1 & -1 & -1 & -1 & 1 & 1 \\ 1 & -1 & 1 & -1 & -1 & 1 & -1 & 1 & 1 & -1 & 1 & -1 & -1 & 1 & -1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & -1 & -1 & -1 & -1 & 1 & 1 & 1 & 1 & -1 & -1 & -1 & -1 \\ 1 & 1 & -1 & -1 & -1 & -1 & 1 & 1 & -1 & -1 & 1 & 1 & 1 & 1 & -1 & -1 \\ 1 & -1 & 1 & -1 & -1 & 1 & -1 & 1 & -1 & 1 & -1 & 1 & 1 & -1 & 1 & -1 \\ 1 & -1 & -1 & 1 & -1 & 1 & 1 & -1 & -1 & 1 & 1 & -1 & 1 & -1 & -1 & 1 \end{pmatrix} \begin{pmatrix} R_{00} \\ R_{01} \\ R_{02} \\ R_{03} \\ R_{10} \\ R_{11} \\ R_{12} \\ R_{13} \\ R_{20} \\ R_{21} \\ R_{22} \\ R_{23} \\ R_{30} \\ R_{31} \\ R_{32} \\ R_{33} \end{pmatrix}$$

Suitably adapted transformations may also be applied if down- and/or up-sampling is performed in a horizontal direction only (e.g. with certain elements set to 0).

The coefficients are then quantized 146 using a linear quantizer. The linear quantizer may use a dead zone of variable size. The linear quantizer may use a dead zone of different size compared to the quantization step and non-centered dequantization offset.

The quantized coefficients are encoded using an entropy coder 148. There are two schemes of entropy coding 148. In a first scheme, the quantized coefficients are encoded using a Run-Length-Encoder (RLE). In a second scheme, the quantized coefficients are first encoded using RLE, then the encoded output is processed using a Huffman Encoder.

If residual mode (RM) has been selected, the L-1 residuals are further ranked and selected in order to determine which residuals should be transformed 144 and encoded. Preferably this is preformed prior to entropy encoding 148.

If the temporal selection mode is selected, the encoder will further modify the coefficients by subtracting the corresponding coefficients derived from a temporal buffer, i.e. temporal prediction described below. The input to the L-1 decoding operation 118 composes the L-1 encoded residuals, which are passed through an entropy decoder, a dequantizer and an inverse transform module. The operations performed by these modules are the inverse operations performed by the modules described above.

If the temporal selection mode has been selected, the residuals may be in part predicted from co-located residuals from a temporal buffer.

If a 4×4 transform is used, the decoded residuals may be fed to a deblocking filter module. The deblocking filter operates on each block of transformed residuals by applying a mask whose weights can be specified. The general structure of the mask is as follows:

$$\begin{matrix} \alpha & \beta & \beta & c \\ \beta & 1 & 1 & \beta \\ \beta & 1 & 1 & \beta \\ \alpha & \beta & \beta & c \end{matrix}$$

where $0 \le \alpha \le 1$ and $0 \le \beta \le 1$.

The output from combining 1 the decoded (and deblocked, if applicable) L-1 residuals and base decoded video is up-sampled 122 in order to generate an up-sampled reconstructed video. The upsampling may be selectable and signalled in the byte stream. The input to the L-2 encoding operation 126 comprises the L-2 residuals obtained by taking the difference 124 between the up-sampled reconstructed video and the input video 102. The L-2 residuals are then transformed 4, quantized 6 and encoded 8 as further described below. The transform 4, quantization 6 and encoding 8 are performed in the same manner as described in relation to L-1 encoding 114. If RM has been selected, the L-2 residuals are further ranked and selected in order to determine which residuals should be transformed and encoded. The L-2 encoding operation 126 may further comprise two additional processes as described below.

If the predicted coefficient mode is selected, the encoder will further modify the transformed coefficient COO (e.g. an "Average" or "A" coefficient for a 2×2 transform). If the 2×2 transform is used, COO will be modified by subtracting the value of the up-sampled residual which the transformed block of residuals is predicted from. If the 4×4 transform is used, COO will be modified by subtracting the average value of the four up-sampled residuals which the transformed block of residuals is predicted from. If the temporal selection mode is selected, the encoder will further modify the coefficients by subtracting the corresponding coefficients derived from a temporal buffer, as described above.

The input to the L-2 decoding operation 134 comprises the encoded L-2 residuals. The decoding process of the L-2 residuals are passed through an entropy decoder 172, a de-quantizer 174 and an inverse transform module 176. The operations performed by these modules are the inverse operations performed by the modules described above. If the temporal selection mode has been selected, the residuals may be in part predicted from co-located residuals from a temporal buffer.

The type of transform performed by the inverse transform module 176 may be indicated by a transform type parameter received by the decoder. For example, a value of zero for the transform type parameter may be used to indicate that a 2×2 directional decomposition transform is to be performed and a value of one for the transform type parameter may be used to indicate that a 4×4 directional decomposition transform is to be performed. In an example, a parameter is received at the decoder indicating that the up-sampling process 138 is to be performed only in the horizontal direction. That is, the up-sampling 138 of a single element outputs a 2×1 block of elements. This parameter is described in more detail further below. In this case, the transform operation 176 applied to a 2×2 block in the array of de-quantized coefficients is as follows:

$$\begin{pmatrix} R_{00} \\ R_{01} \\ R_{10} \\ R_{11} \end{pmatrix} = \begin{pmatrix} 1 & 1 & 1 & 0 \\ 1 & -1 & -1 & 0 \\ 0 & 1 & -1 & 1 \\ 0 & -1 & 1 & 1 \end{pmatrix} \begin{pmatrix} C_0 \\ C_1 \\ C_2 \\ C_3 \end{pmatrix}$$

When the up-sampling 138 is only performed in the horizontal direction, the transform operation 176 applied to a 4×4 block in the array of de-quantized coefficients is as follows:

$$\begin{pmatrix} R_{00} \\ R_{01} \\ R_{02} \\ R_{03} \\ R_{10} \\ R_{11} \\ R_{12} \\ R_{13} \\ R_{20} \\ R_{21} \\ R_{22} \\ R_{23} \\ R_{30} \\ R_{31} \\ R_{32} \\ R_{33} \end{pmatrix} = \begin{pmatrix} 1 & 1 & 1 & 1 & 1 & 1 & 1 & 1 & 0 & 0 & 0 & 0 & 1 & 1 & 1 & 1 \\ 1 & 1 & -1 & -1 & 1 & 1 & -1 & -1 & 0 & 0 & 0 & 0 & 1 & 1 & -1 & -1 \\ 0 & 0 & 0 & 0 & 1 & 1 & 1 & 1 & 1 & 1 & 1 & 1 & -1 & -1 & -1 & -1 \\ 0 & 0 & 0 & 0 & -1 & -1 & -1 & -1 & 1 & 1 & 1 & 1 & 1 & 1 & 1 & 1 \\ 1 & -1 & 1 & -1 & 1 & -1 & 1 & -1 & 0 & 0 & 0 & 0 & 1 & -1 & 1 & -1 \\ 1 & -1 & 1 & -1 & -1 & 1 & -1 & 1 & 0 & 0 & 0 & 0 & -1 & 1 & -1 & 1 \\ 0 & 0 & 0 & 0 & 1 & -1 & 1 & -1 & 1 & -1 & 1 & -1 & -1 & 1 & -1 & 1 \\ 0 & 0 & 0 & 0 & -1 & 1 & -1 & 1 & 1 & -1 & 1 & -1 & 1 & -1 & 1 & -1 \\ 1 & 1 & -1 & -1 & 1 & 1 & -1 & -1 & 0 & 0 & 0 & 0 & 1 & 1 & -1 & -1 \\ 1 & 1 & -1 & -1 & -1 & -1 & 1 & 1 & 0 & 0 & 0 & 0 & -1 & -1 & 1 & 1 \\ 0 & 0 & 0 & 0 & 1 & 1 & -1 & -1 & 1 & 1 & -1 & -1 & -1 & -1 & 1 & 1 \\ 0 & 0 & 0 & 0 & -1 & -1 & 1 & 1 & 1 & 1 & -1 & -1 & 1 & 1 & -1 & -1 \\ 1 & -1 & -1 & 1 & 1 & -1 & -1 & 1 & 0 & 0 & 0 & 0 & 1 & -1 & -1 & 1 \\ 1 & -1 & -1 & 1 & -1 & 1 & 1 & -1 & 0 & 0 & 0 & 0 & -1 & 1 & 1 & -1 \\ 0 & 0 & 0 & 0 & 1 & -1 & -1 & 1 & 1 & -1 & -1 & 1 & -1 & 1 & 1 & -1 \\ 0 & 0 & 0 & 0 & -1 & 1 & 1 & -1 & 1 & -1 & -1 & 1 & 1 & -1 & -1 & 1 \end{pmatrix} \begin{pmatrix} C_{00} \\ C_{01} \\ C_{02} \\ C_{03} \\ C_{10} \\ C_{11} \\ C_{12} \\ C_{13} \\ C_{20} \\ C_{21} \\ C_{22} \\ C_{23} \\ C_{30} \\ C_{31} \\ C_{32} \\ C_{33} \end{pmatrix}$$

The modified up-sampling process 138 comprises two steps, the second depending on a signalling received by the decoder. In a first step, the combination 136 of the decoded (and deblocked, if applicable) L-1 residuals and base decoded video 8 (L-1 reconstructed video) is up-sampled 166 to generate an up-sampled reconstructed video. If the predicted coefficient mode has been selected, then a second step is implemented. In particular, the value 168 of the element in the L-1 reconstructed value from which a 2×2 block in the up-sampled reconstructed video was derived is added 170 to said 2×2 block in the up-sampled reconstructed video.

The encoding and decoding schemes of FIGS. 3 and 4 use the tools described above, as well as the following tools. Based on the Predicted Residual mode that was selected, the encoder will further modify the upsampled reconstructed video by applying Predicted Residuals (PRs). Predicted Residuals are based on the upsampled reconstructed video and on the pre-upsampling reconstructed lower resolution video. A predicted residual may also be known as a predicted average or a modifier as described in more detail below.

If the temporal selection mode is selected, the encoder will further modify the coefficients by adding the corresponding coefficients derived from a temporal buffer.

Throughout the above, the term bitstream may be replaced by stream or bytestream or NALU stream as appropriate.

FIG. 4 illustrates an example of the modified up-sampling process 138 used in the decoding process illustrated in FIG. 2. The modified up-sampling process 138 is expanded in more detail in FIG. 4 to provide an example of how this process may be performed.

An example of the modified up-sampling process 138 may be summarised using the following pseudo-code:

```
for (ySrc = O; ySrc < nCurrS; ++ySrc)
yDst = ySrc << l
for (xSrc = O; xSrc < nCurrS; ++xSrc)
xDst = xSrc << l
modifier = resFilteredSamples[ xSrc][ySrc] -
(resUpsampledSamples[xDst] [yDst] + resUpsampledSamples[ xDst+l]
[yDst] +
resUpsampledSamples[xDst] [yDst+l] + resUpsampledSamples[xDst+
l][yDst+l])
>>2
resModifiedUpsampledSamples[xDst] [yDst] =
resUpsampledSamples[xDst] [yDst] + modifier
resModifiedUpsampledSamples[xDst] [yDst+l] =
resUpsampledSamples[xDst+l][yDst] + modifier
resModifiedUpsampledSamples[ xDst+l][yDst] =
resUpsampledSamples[xDst][yDst+l] + modifier
resModifiedUpsampledSamples[ xDst+l][yDst+l] =
resUpsampledSamples[xDst+l][yDst+l] + modifier
```

where: nCurrS=size of the (nCurrS)×(nCurrS) array of elements in the L-1 reconstructed video; xSrc, ySrc are index values used to specify a given element in the array of elements in the L-1 reconstructed video; xDst, yDst are index values used to specify a given element in either the array of elements in the up-sampled reconstructed video or the array of elements in the modified up-sampled reconstructed video; resFilteredSamples is an array of elements in the L-1 reconstructed video; resUpsampledSamples is an array of elements in the up-sampled reconstructed video; and resModifiedUpsampledSamples is a modified array of elements in the upsampled-reconstructed video.

In this example, the input to the modified up-sampling process 138 is the combination of the decoded (and deblocked, if applicable) L-1 residuals and base decoded video. This combination is represented in the pseudo-code above by the variable resFilteredSamples. This combination may be called the L-1 reconstructed video.

The L-1 reconstructed video is up-sampled 166 to generate an up-sampled reconstructed video. In this example, the up-sampling 166 is performed in both vertical and horizontal directions such that a single value in the L-1 reconstructed video is up-sampled 166 to generate a 2×2 block of elements in the up-sampled reconstructed video. As such, in this example, the size of the array has increased as a result of the up-sampling 166 from 1×1 in the L-1 reconstructed video to 2×2 in the up-sampled reconstructed video, therefore increasing along both dimensions (vertical and horizontal) of the array. The 2×2 block of elements in the up-sampled reconstructed video is represented in the above pseudo-code by the variable resUpsampledSamples.

A modifier 168 is calculated using the value in the L-1 reconstructed video and the 2×2 block of elements in the up-sampled reconstructed video. The modifier 168 may also be known as a predicted average. The modifier 168 represents a difference between the value in the L-1 reconstructed video and the average of values in the 2×2 block in the up-sampled reconstructed video in this example.

The modifier 168 is then added 170 to each of the elements in the 2×2 block in the up-sampled reconstructed video, thereby generating a modified 2×2 block of elements in the up-sampled reconstructed video. The modified 2×2 block of elements in the up-sampled reconstructed video is represented in the above pseudo-code by the variable resModifiedUpsampledSamples.

Adding the modifier 168 may be performed as part of the transform process 176. Adding the modifier 168 as part of the modified up-sampling process 138 as opposed to as part of the transform process 176 may reduce the complexity of the decoding process. For example, this approach obviates the need for the transform process 176 to involve additionally transforming the modifier as well as the de-quantized coefficients obtained from the encoded level 2 stream 128. Adding the modifier 168 as part of the modified up-sampling process 138 as opposed to as part of the transform process 176 is possible because the transform process 176 involves a linear transformation. Therefore, the decoded video 142 resulting from adding the modifier 168 as part of the transform process is the same as the decoded video 142 resulting from adding the modifier 168 as part of the modified up-sampling process, but is generated more efficiently.

The modified 2×2 block of elements in the up-sampled reconstructed video that is output from the modified up-sampling process 138 is subsequently added 140 to a corresponding 2×2 block of L-2 residuals to generate a 2×2 block of elements in the decoded video 142.

The adding of the modifier 168 may be performed based on rece1vmg a parameter indicating that the modifier 168 is to be added to the 2×2 block in the up-sampled reconstructed video to generate the modified 2×2 block. In this example, if the parameter is not received, the modifier 168 will not be added and it will be the 2×2 block in the up-sampled reconstructed video generated from the up-sampling process 166 that is added 140 to a corresponding 2×2 block of L-2 residuals to generate a 2×2 block of elements of the decoded video 142. Alternatively, the parameter may be received but may indicate that the modifier 168 will not be added. The value of the parameter may have a bit length of one bit. The parameter may be received once for a group of pictures associated with the encoded streams discussed above, the group of pictures being a collection of successive pictures within a coded video stream. The modified up-sampling process 138 may comprise retrieving an indicator from a header accompanying data. The indicator may be retrieved from a predetermined location of the header and may indicate one or more actions. The indicator may indicate whether to perform the modified up-sampling process 138

In another example, the modified up-sampling process 138 may be summarised, using the same variables as defined in the above pseudo-code, by the following pseudo-code:

```
for (ySrc = 0; ySrc < nCurrS; ++ySrc)
yDst = ySrc
for (xSrc = 0; xSrc < nCurrS; ++xSrc)
xDst = xSrc << l
modifier = resFilteredSamples[ xSrc] [ySrc] -
(resUpsampledSample[xDst] [yDst] + resUpsampledSamples[ xDst+ l]
[yDst])>>l
resModifiedUpsampledSamples[xDst] [yDst] =
resUpsampledSamples[ xDst] [yDst] + modifier
resModifiedUpsampledSamples[xDst+ l][yDst] =
resUpsampledSamples[xDst+l][yDst] + modifier
```

In this other example, the up-sampling 166 is performed only in the horizontal direction such that a single value in the L-1 reconstructed video is up-sampled 166 to generate a 2×1 block of elements in the up-sampled reconstructed video. As such, the size of the array has increased as a result of the up-sampling 166 from 1×1 in the L-1 reconstructed video to 2×1 in the up-sampled reconstructed video, therefore increasing along only along one direction (horizontally) of the array. In this case, the modifier 168 represents a difference between the value in the L-1 reconstructed and the average of values in the 2×1 block of elements in the up-sampled reconstructed video. Addition 170 of the modifier 168 to each of the elements in the 2×1 block in the up-sampled reconstructed generates a modified 2×1 block of elements m the up-sampled reconstructed video.

The directions in which the up-sampling 166 is performed may be determined by a received parameter indicating the directions in which the up-sampling 166 is to be performed. For example, a value of 1 for the parameter may be used to indicate that the up-sampling 166 is only in the horizontal direction whereas a value of 0 for the parameter may be used to indicate that the up-sampling 166 is in both the vertical and horizontal directions.

In the decoding process described herein, generating the decoded video 142 may be performed block-wise. In this way, generating a block of elements in a frame of the decoded video 142 can be performed without using another block of elements in the same frame of the decoded video 142 that was previously generated. For this reason, the modified up-sampling process 138 can be performed in parallel for all blocks of elements in a frame as opposed to sequentially performing the modified up-sampling process 138 for each block of elements in the frame. Further examples are described below.

Some further examples relate to a method of encoding an input video into a plurality of encoded streams, such that the encoded streams may be combined to reconstruct the input video, the method comprising: receiving a full resolution input video; downsampling the full resolution input video to create a downsampled video; encoding the downsampled video using a first codec to create a base encoded stream; reconstructing a video from the encoded video to generate a reconstructed video; comparing the reconstructed video to the input video; and, creating one or more further encoded streams based on the comparison. The input video compared to the reconstructed video may be the downsampled video.

According to an example method, comparing the reconstructed video to the input video comprises: comparing the reconstructed video to the downsampled video to create a first set of residuals and wherein creating the one or more further encoded streams comprises encoding the first set of residuals to create a first level encoded stream.

The input video compared to the reconstructed video may be the full resolution input video and the reconstructed video may be upsampled.

According to an example method, comparing the reconstructed video to the input video comprises: upsampling the reconstructed video to generate an up-sampled reconstructed video; and, comparing the up-sampled reconstructed video to the full resolution input video to create a second set of residuals and wherein creating the one or more further encoded streams comprises encoding the second difference to create a second level encoded stream.

Accordingly, in an example, the method may generate a base encoded stream, a first level encoded stream and a second level encoded stream according to the above defined example methods. Each of the first level encoded stream and the second level encoded stream may contain enhancement data used by a decoder to enhance the encoded base stream.

According to an example method, the step of encoding the first set of residuals comprises: applying a transform to the set of residuals to create a set of coefficients; applying a quantization operation to the coefficients to create a set of quantized coefficients; and, applying an encoding operation to the quantized coefficients.

According to an example method, the step of encoding the second set of residuals comprises: applying a transform to the second set of residuals to create a set of coefficients; applying a quantization operation to the coefficients to create a set of quantized coefficients; and, applying an encoding operation to the quantized coefficients.

The transform for encoding the first and/or second set of residuals may for example be a discrete cosine transform or a wavelet transform. In an alternative example, the transform may be a small transform (e.g.: using a 2×2 kernel or a 4×4 kernel) which decomposes a block of elements into directional components. For example, the 2×2 kernel may be a Hadamard transform. More details on the transform can be found for example in patent applications PCT/EP13/059847 or PCT/GB17/052632, which are incorporated herein by reference. In a further example, the encoder may select between different transforms to be used, for example between the 2×2 kernel and the 4×4 kernel. This enables further flexibility in the way the residuals are encoded. The selection of the transform may be based on an analysis of the data to be transformed.

The first set of residuals and second set of residuals may have different transforms applied to them and the selection may be predetermined or selected during the process. The transform used may be signalled in a header.

The quantization for encoding the first and/or second set of residuals may for example be a linear quantization. The linear quantizer may use a dead zone of variable size. The encoding operation may for example be an entropy encoder and may include run-length encoding and/or Huffman encoding. Residuals may be a difference between two videos or frames.

The step of encoding the first set of residuals may comprise: ranking the first set of residuals based on a pre-analysis of the first set of residuals; and, selecting a subset of residuals to be transformed and encoded.

In an example, the method comprises analysing the first set of residuals and, based on the analysis, either performing the following steps or not: ranking the first set of residuals; and, selecting a subset of residuals to be transformed and encoded.

In an example, the method comprises analysing the first set of residuals and: ranking the first set of residuals; and, selecting a subset of residuals to be transformed and encoded, such that the steps of ranking and/or selecting are performed differentially based on the analysis.

According to an example method, the step of applying a transform is performed on the selected subset of residuals of the first set of residuals.

The step of encoding the second set of residuals may comprise: ranking the second set of residuals based on a pre-analysis of the second set of residuals; and, selecting a subset of residuals to be transformed and encoded. In an example, the method comprises analysing the second set of residuals and, based on the analysis, either performing the following steps or not: ranking the second set of residuals; and/or, selecting a subset of residuals to be transformed and encoded.

In an example, the method comprises analysing the second set of residuals and: ranking the second set of residuals; and, selecting a subset of residuals to be transformed and encoded, such that the steps of ranking and/or selecting are performed differentially based on the analysis.

According to an example method, the step of applying a transform is performed on the selected subset of residuals of the second set of residuals.

The encoded streams may be accompanied by one or more headers which include parameters indicating aspects of the encoding process to facilitate decoding. For example, the headers may include the codec used, the transform applied, the quantization applied, and/or other decoding parameters.

In certain examples the step of quantization may comprise adapting the quantization based on an analysis of the coefficients and/or data to be transformed, for example, the residuals data. In certain examples the distribution used in the quantization step may be adapted. The step of encoding the first set of residuals may comprise: deriving a set of temporal coefficients from a temporal buffer; and, subtracting the set of temporal coefficients from the set of coefficients.

The step of encoding the second set of residuals may comprise: deriving a set of temporal coefficients from a temporal buffer; and, subtracting the set of temporal coefficients from the set of coefficients.

It was described above how a step of ranking and selecting may be applied to the residuals data, a step of subtracting temporal coefficients may be performed and also that quantization may be adapted. Each of these steps may be predetermined and selectively applied or may be applied based on analysis of the input video, downsampled video, reconstructed video, upsampled video or any combination of the above to improve the overall performance of the encoder. The steps may be selectively applied based on a predetermined set of rules or determinatively applied based on the analysis or feedback of the performance.

According to an example method the first codec is a hardware-based codec, preferably the first codec is AVC, HEVC, AVI, VP8, or VP9.

An example method further comprises sending the base encoded stream. An example method further comprises sending the first level encoded stream. An example method further comprises sending the second level encoded stream.

Some further examples relate to a method of decoding a plurality of encoded streams into a reconstructed output video, the method comprising: receiving a first base encoded stream; decoding the first base encoded stream according to a first codec to generate a first output video; receiving one or more further encoded streams; decoding the one or more further encoded streams to generate a set of residuals; and, combining the set of residuals with the first video to generate a decoded video.

In an example, the method comprises retrieving a plurality of decoding parameters from a header. The decoding parameters may indicate which procedural steps were included in the encoding process.

In an example the step of decoding the one or more further encoded streams to generate a set of residuals comprises: applying an entropy decoding operation; applying a de-quantization operation; and, applying an inverse transform operation to generate a set of residuals.

In an example, the step of decoding the one or more further encoded streams to generate a set of residuals comprises: predicting a subset of residuals based on co-located residuals from a temporal buffer.

In an example the method may comprise receiving a first level encoded stream and receiving a second level encoded stream. In this example the step of decoding the one or more further encoded streams to generate a set of residuals comprises: decoding the first level encoded stream to derive a first set of residuals; wherein the step of combining the set of residuals with the first video to generate a decoded video, comprises: combining the first set of residuals with the first output video to generate a second output video; upsampling the second output video to generate an up-sampled second output video; decoding the second level encoded stream to derive a second set of residuals; and, combining the second set of residuals with the second output video to generate a reconstructed output video.

In an example, the step of upsampling the second output video to generate an up-sampled second output video comprises: adding a value of an element in the first set of residuals from which a block in the up-sampled second output video was derived to a corresponding block in the up-sampled second output video. The block may be a 2×2 block. This addition step may be selectively performed based on a predetermined value or a signal included in a header.

In an example, the step of decoding the first level encoded stream to derive a first set of residuals, comprises: applying an entropy decoding operation; applying a de-quantization operation; and, applying an inverse transform operation to generate the first set of residuals.

In this example, the step of decoding the first level encoded stream to derive a first set of residuals, comprises: applying a de-blocking filter configured to apply a mask to a block of residuals. The mask may be weighted according to a set of predefined weights.

In an example, the step of decoding the second level encoded stream to derive a second set of residuals, comprises: applying an entropy decoding operation; applying a de-quantization operation; and, applying an inverse transform operation to generate the second set of residuals. The inverse transform operation may be an inverse operation of the operations defined above or may be a substantially mirrored operation. That is, a 2×2 block or 4×4 block transform may be selectively applied. The transform may be detected by the decoding method or signalled in a header.

If a 2×2 transform is used, coefficients may be modified by adding a value of the residual which the transformed block of residuals is predicted from. If a 4×4 transform is used, coefficients will be modified by adding an average value of the four residuals.

The method may further comprise displaying or outputting the reconstructed output. In an example, the above described methods further comprise retrieving an indicator from a header accompanying data.

The indicator may be retrieved from a predetermined location of the header and may indicate one or more actions. The indicator may indicate whether to perform the step of adding residuals and/or predicting residuals as specified in the above statements. The indicator may indicate whether the decoder should perform certain operations, or be configured to perform certain operations, in order to decode the bitstream. The indicator may indicate if such steps have been performed at the encoder stage.

Some further examples relate to an apparatus for encoding a data set into an encoded data set comprising a header and a payload. The apparatus configured to encode an input video according to the above steps. The apparatus may comprise a processor configured to carry out the method of any of the above aspects.

Some further examples relate to an apparatus for decoding a data set into a reconstructed video from a data set comprising a header and a payload. The apparatus configured to decode an output video according to the above steps. The apparatus may comprise a processor configured to carry out the method of any of the above aspects.

An encoder and decoder may also be provided. Some further examples relate to computer readable media which when executed by a processor cause the processor to perform any of the methods of the above aspects. The above embodiments are to be understood as illustrative examples.

Further examples are envisaged. It is to be understood that any feature described in relation to any one example may be used alone, or in combination with other features described, and may also be used in combination with one or more features of any other of the examples. or any combination of any other of the examples. Furthermore. equivalents and modifications not described above may also be employed without departing from the scope of the accompanying claims.

The invention claimed is:

1. A method of decoding a plurality of encoded streams into a reconstructed output video, the method comprising:
- receiving a first level encoded stream;
- decoding the first level encoded stream to derive a first set of residuals;
- receiving a first output video, the first output video comprising an output of a base decoder applied to a base level encoded stream;
- combining the first set of residuals with the first output video to generate a second output video;
- up-sampling the second output video to generate an up-sampled second output video, the up-sampling comprising:
  - adding a value derived from an element in the first set of residuals from which a block in the up-sampled second output video was derived to the block in the up-sampled second output video;
  - receiving a second level encoded stream;
  - decoding the second level encoded stream to derive a second set of residuals; and
  - combining the second set of residuals with the up-sampled second output video to generate the reconstructed output video.

2. The method of claim 1, wherein adding the value derived from the element in the first set of residuals is performed based on receiving a parameter indicating that the value derived from the element in the first set of residuals is to be added to the block in the up-sampled second output video.

3. The method of claim 2, wherein a bit-length of a value of the parameter is one bit.

4. The method of claim 1, wherein the parameter is received once for a group of pictures associated with the plurality of encoded streams.

5. The method of claim 1, wherein a first block of elements from a frame in the reconstructed output video corresponding to the block in the up-sampled second output video is generated without using a second block of elements from the frame in the reconstructed output video.

6. The method of claim 1, wherein decoding the first level encoded stream to derive the first set of residuals comprises:
- applying a first entropy decoding operation;
- applying a first de-quantization operation; and,
- applying a first transform operation to generate the first set of residuals.

7. The method of claim 1, wherein decoding the first level encoded stream to derive the first set of residuals comprises applying a de-blocking filter configured to apply a mask to a block of residuals, the mask being weighted according to a set of predefined weights.

8. The method of claim 1, wherein decoding the second level encoded stream to derive the second set of residuals comprises:
- applying a second entropy decoding operation;
- applying a second de-quantization operation to generate a set of de-quantized transform coefficients; and, applying a second transform operation to the set of de-quantized transform coefficients to generate the second set of residuals.

9. The method of claim 8, comprising receiving a transform type parameter indicating a type of the second transform operation to be applied.

10. The method of claim 8, wherein the second transform operation is a 2×2 directional decomposition transform, the set of de-quantized transform coefficients representing a 2×2 block of elements from the set of de-quantized transform coefficients and the second set of residuals represent a 2×2 block of elements from the second set of residuals.

11. The method of claim 8, wherein the second transform operation uses a 4×4 directional decomposition transform, wherein the set of de-quantized transform coefficients represents a 4×4 block of elements from the set of de-quantized transform coefficients and the second set of residuals represents a 4×4 block of elements from the second set of residuals.

12. The method of claim 11, wherein the value derived from the element in the first set of residuals is based on an average value of four residuals from which a 4×4 block of elements from the reconstructed output video is derived.

13. The method of claim 1, wherein the block in the up-sampled second output video is a 2×2 block of elements from the up-sampled second output video.

14. The method of claim 1, wherein receiving the first output video comprises:
- receiving the base level encoded stream;
- decoding the base level encoded stream according to the base decoder to generate the first output video.

15. A decoding apparatus comprising:
- a first decoder configured to:
  - receive a first level encoded stream; and
  - decode the first level encoded stream to derive a first set of residuals;
- a first combiner configured to:
  - receive a first output video, the first output video comprising an output of a base decoder applied to a base level encoded stream; and
  - combine the first set of residuals with the first output video to generate a second output video;
- an up-sampler configured to up-sample the second output video to generate an up-sampled second output video, the up-sampling comprising:
  - adding a value derived from an element in the first set of residuals from which a block in the up-sampled second output video was derived to the block in the up-sampled second output video;
- a second decoder configured to:
  - receive a second level encoded stream; and
  - decode the second level encoded stream to derive a second set of residuals; and
- a second combiner configured to:
  - combine the second set of residuals with the up-sampled second output video to generate the reconstructed output video.

16. The decoding apparatus of claim 15, wherein the up-sampler is configured to add the value derived from the element in the first set of residuals based on receiving a parameter indicating that the value derived from the element in the first set of residuals is to be added to the block in the up-sampled second output video.

17. A non-transitory computer-readable medium having stored thereon computer readable instructions which, when executed by a processor, cause an apparatus to perform the method according to claim 1.

* * * * *